US012633512B2

(12) United States Patent
Jeong et al.

(10) Patent No.: US 12,633,512 B2
(45) Date of Patent: May 19, 2026

(54) ANODE FOR SECONDARY BATTERY, MANUFACTURING METHOD THEREOF AND LITHIUM SECONDARY BATTERY INCLUDING THE SAME

(71) Applicant: SK ON CO., LTD., Seoul (KR)

(72) Inventors: Kyung Hee Jeong, Daejeon (KR); Sung Wan Park, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/448,691

(22) Filed: Aug. 11, 2023

(65) Prior Publication Data

US 2024/0170632 A1     May 23, 2024

(30) Foreign Application Priority Data

Nov. 17, 2022     (KR) ........................ 10-2022-0154449

(51) Int. Cl.
*H01M 4/04*          (2006.01)
*H01M 4/38*          (2006.01)
          (Continued)

(52) U.S. Cl.
CPC ......... *H01M 4/0404* (2013.01); *H01M 4/386* (2013.01); *H01M 4/70* (2013.01);
          (Continued)

(58) Field of Classification Search
CPC ...... H01M 4/70; H01M 4/0404; H01M 4/386; H01M 10/052; H01M 10/0525; H01M 2004/027
See application file for complete search history.

(56) References Cited

U.S. PATENT DOCUMENTS

2011/0143201 A1     6/2011  Takada et al.
2013/0280594 A1*   10/2013  Kajita ................... H01M 4/386
                                                          429/211
(Continued)

FOREIGN PATENT DOCUMENTS

CN          203013835 U       6/2013
CN          114766066 A       7/2022
          (Continued)

OTHER PUBLICATIONS

Merriam-Webster's Dictionary: Face [online version] (https://www.merriam-webster.com/dictionary/face) (Year: 2024).*

(Continued)

*Primary Examiner* — Jeremiah R Smith
(74) *Attorney, Agent, or Firm* — Perkins Coie LLP

(57)          ABSTRACT
Anodes and secondary batteries including the anodes are disclosed. In some embodiments of the disclosed technology, an anode includes: an anode current collector; and an anode mixture layer disposed on at least one surface of the anode current collector. The anode mixture layer includes a silicon-based active material, the anode current collector includes a tab connection portion, a shoulder portion, and a rounded portion located therebetween, the rounded portion has a radius of curvature satisfying a value R measured in millimeter (mm) in a range according to Equation expressed as:

$$(p \times A + q) - r < R \leq (p \times A + q) + r;$$

wherein A is a value corresponding to a weight ratio measured in weight percent (wt %) of the silicon-based active material to the anode mixture layer, p is a value ranging from 0.05 to 0.2, q is a value ranging from 0.1 to 1, and r is a value ranging from 0.1 to 1.

9 Claims, 5 Drawing Sheets

100

(51) Int. Cl.

| | |
|---|---|
| *H01M 4/70* | (2006.01) |
| *H01M 10/052* | (2010.01) |
| *H01M 4/02* | (2006.01) |
| *H01M 10/0525* | (2010.01) |

(52) U.S. Cl.
CPC .... *H01M 10/052* (2013.01); *H01M 2004/021* (2013.01); *H01M 2004/027* (2013.01); *H01M 10/0525* (2013.01)

(56) References Cited

U.S. PATENT DOCUMENTS

| | | | | |
|---|---|---|---|---|
| 2014/0193710 | A1* | 7/2014 | Hasegawa | H01M 10/0585 |
| | | | | 429/211 |
| 2015/0111088 | A1* | 4/2015 | Hiroki | H01M 50/46 |
| | | | | 429/233 |
| 2018/0183065 | A1* | 6/2018 | Sasaki | H01M 10/0562 |
| 2018/0269458 | A1* | 9/2018 | Oh | H01M 50/124 |
| 2019/0109314 | A1* | 4/2019 | Jin | H01M 50/538 |
| 2020/0185690 | A1 | 6/2020 | Kim et al. | |
| 2020/0185700 | A1* | 6/2020 | Kamiyama | H01M 10/054 |
| 2020/0321658 | A1* | 10/2020 | Fukunaga | H01M 10/0585 |
| 2021/0273261 | A1* | 9/2021 | Kim | H01M 10/0568 |
| 2023/0117186 | A1* | 4/2023 | Shi | H01M 10/0525 |
| | | | | 429/231.95 |
| 2024/0006585 | A1 | 1/2024 | Wu et al. | |

FOREIGN PATENT DOCUMENTS

| | | | |
|---|---|---|---|
| EP | 3832759 | A1 | 6/2021 |
| JP | 2013-073757 | A | 4/2013 |
| KR | 10-2016-0092748 | A | 8/2016 |
| KR | 10-2019-0028131 | A | 3/2019 |
| KR | 10-2022-0072353 | A | 6/2022 |
| WO | 2013031891 | A1 | 3/2013 |

OTHER PUBLICATIONS

European Search Report issued in EP Patent Application No. 23190714.8, dated Feb. 1, 2024, 11 pages.

Chen, L. et al., "Binder effect on cycling performance of silicon/carbon composite anodes for lithium ion batteries," Journal of Applied Electrochemistry (2006) 36:1099-1104, Springer 2006, DOI 10.1007/s10800-006-9191-2, 6 pages.

Zhu, P. et al., "A review of current collectors for lithium-ion batteries," Journal of Power Sources, 485 (2021) 229321 (21 pages).

Suzuki, K. et al., "Tensile and microbend tests of pure aluminum foils with different thicknesses," Materials Science and Engineering, 513-514 (2009) 77-82 (6 pages).

Office Action for Chinese Patent Application No. 202311013884.X, mailed Sep. 5, 2024 (5 pages).

* cited by examiner

100

100

100

100

ANODE FOR SECONDARY BATTERY, MANUFACTURING METHOD THEREOF AND LITHIUM SECONDARY BATTERY INCLUDING THE SAME

CROSS-REFERENCE TO RELATED APPLICATION

This patent document claims the priority and benefit of Korean Patent Application No. 10-2022-0154449 filed on Nov. 17, 2022, the disclosure of which is incorporated herein by reference in its entirety.

TECHNICAL FIELD

The disclosed technology relates to devices with electrodes including, e.g., electrochemical devices such as a secondary battery and specifically an anode for a device with anode and cathode and a secondary battery.

BACKGROUND

With the recent interest in environmental issues, the demand for secondary batteries, which can be used as power sources for electric vehicles (EVs) and portable electronic devices, is increasing. Typically, a secondary battery includes an anode, a cathode, and a separator interposed therebetween, and the anode includes a carbon-based active material, such as graphite, as an active material.

SUMMARY

The disclosed technology can be implemented in some embodiments to provide an anode for a device with electrodes including, e.g., an electrochemical device such as a secondary battery, which includes a silicon-based active material to secure excellent capacitance characteristics and has excellent life characteristics by significantly reducing or eliminating fracture of a current collector.

The disclosed technology can also be implemented in some embodiments to provide a method of manufacturing an anode for various devices including a secondary battery capable of effectively suppressing fracture, while maintaining a thin thickness of an anode current collector.

In some embodiments of the disclosed technology, an anode includes: an anode current collector; and an anode mixture layer disposed on at least one surface of the anode current collector, wherein the anode mixture layer includes a silicon-based active material, wherein the anode current collector includes a tab connection portion, a shoulder portion, and a rounded portion located therebetween, and wherein the rounded portion has a radius of curvature satisfying value R according to Equation 1 below.

$$(p \times A + q) - r < R \leq (p \times A + q) + r \qquad \text{[Equation 1]}$$

In Equation 1, all parameters p, A, q, r, and R are numerical values without units. The numerical value of R represents a value of the radius of curvature measured in millimeter (mm) of the rounded portion; the value of A corresponds to a weight ratio measured in weight percent (wt %) of the silicon-based active material to the anode mixture layer; p is a numerical value ranging from 0.05 to 0.2; q is a numerical value ranging from 0.1 to 1; and r is a numerical value ranging from 0.1 to 1.

In Equation 1, a value of p may include 0.1.
In Equation 1, a value of q may include 0.5.
In Equation 1, a value of r may include 0.5.

The anode current collector may have a thickness ranging from 1 to 10 μm.

A weight ratio of the silicon-based active material to the anode mixture layer may range from 3 to 50 wt %.

The silicon-based active material may include at least one of Si, SiOx (0<x<2), Q-doped or Q-coated SiOx (0<x<2), Si-Q alloy, or Si—C composite, wherein Q includes at least one of alkali metals, alkaline earth metals, Group 13 elements, Group 14 elements, Group 15 elements, Group 16 elements, transition metals, rare earth elements, or a combination of one or more of alkali metals, alkaline earth metals, Group 13 elements, Group 14 elements, Group 15 elements, Group 16 elements, transition metals, and rare earth elements, without Si.

The anode mixture layer may further include a conductive material, and wherein a weight ratio of the conductive material to the anode mixture layer may range from 0.1 to 10 wt %.

The anode mixture layer may further include a binder, and wherein a weight ratio of the binder to the anode mixture layer may range from 0.1 to 10 wt %.

In some embodiments of the disclosed technology, a method of manufacturing an anode may include: preparing a first anode including a first anode current collector with a fracture and a second anode including a second anode current collector without a fracture under a same charging and discharging condition; and constructing a third anode including a third anode current collector and having a plastic strain (PS) value lower than a plastic strain (PS) value of the second anode. Each of the first anode, the second anode, and the third anode includes an anode mixture layer disposed on at least one surface of the first anode current collector, the second anode current collector, and the third anode current collector, respectively, wherein the anode mixture layer includes a silicon-based active material, wherein each of the first anode current collector, the second anode current collector, and the third anode current collector includes a tab connection portion, a shoulder portion, and a rounded portion located therebetween, and wherein the plastic strain (PS) value for each of the second anode and the third anode is a maximum plastic strain value of the rounded portion.

The preparing of the third anode may be performed under a condition that a surface direction expansion rate value of the third anode is greater than or equal to a surface direction expansion rate value of the second anode.

A PS value ratio of the third anode to the second anode may be equal to or larger than 0.1 and less than 1.

The PS value of the third anode may range from 0.1 to 20%.

A thickness of the anode current collector of the first anode may be less than a thickness of the anode current collector of the second anode.

A thickness of the anode current collector of the third anode may be less than the thickness of the anode current collector of the second anode.

The third anode may include a rounded portion that has a radius of curvature satisfying value R according to Equation 1 below.

$$(p \times A + q) - r < R \leq (p \times A + q) + r \qquad \text{[Equation 1]}$$

In Equation 1, all parameters p, A, q, r, and R are numerical values without units. The numerical value of R represents a value of the radius of curvature measured in millimeter (mm) of the rounded portion; the value of A corresponds to a weight ratio measured in weight percent (wt %) of the silicon-based active material to the anode mixture layer; p is a numerical value ranging from 0.05 to 0.2; q is a numerical value ranging from 0.1 to 1; and r is a numerical value ranging from 0.1 to 1.

In some embodiments of the disclosed technology, a secondary battery includes the anode including an anode current collector; and an anode mixture layer disposed on at least one surface of the anode current collector, wherein the anode mixture layer includes a silicon-based active material, wherein the anode current collector includes a tab connection portion, a shoulder portion, and a rounded portion located therebetween, and wherein the rounded portion has a radius of curvature satisfying value R according to Equation 1 below.

$$(p{\times}A+q)-r<R{\leq}(p{\times}A+q)+r \qquad \text{[Equation 1]}$$

In Equation 1, all parameters p, A, q, r, and R are numerical values without units. The numerical value of R represents a value of the radius of curvature measured in millimeter (mm) of the rounded portion; the value of A corresponds to a weight ratio measured in weight percent (wt %) of the silicon-based active material to the anode mixture layer; p is a numerical value ranging from 0.05 to 0.2; q is a numerical value ranging from 0.1 to 1; and r is a numerical value ranging from 0.1 to 1.

The anode current collector may have a thickness ranging from 1 to 10 μm.

A weight ratio of the silicon-based active material to the anode mixture layer may range from 3 to 50 wt %.

The silicon-based active material may include at least one of Si, SiOx (0<x<2), Q-doped or Q-coated SiOx (0<x<2), Si-Q alloy, or Si—C composite, wherein Q includes at least one of alkali metals, alkaline earth metals, Group 13 elements, Group 14 elements, Group 15 elements, Group 16 elements, transition metals, rare earth elements, or a combination of one or more of alkali metals, alkaline earth metals, Group 13 elements, Group 14 elements, Group 15 elements, Group 16 elements, transition metals, and rare earth elements, without Si.

The anode mixture layer may further include a conductive material, and wherein a weight ratio of the conductive material to the anode mixture layer may range from 0.1 to 10 wt %.

The anode mixture layer may further include a binder, and wherein a weight ratio of the binder to the anode mixture layer may range from 0.1 to 10 wt %.

BRIEF DESCRIPTION OF DRAWINGS

Certain features and advantages of the disclosed technology are illustrated by the following detailed description with reference to the accompanying drawings.

DETAILED DESCRIPTION

Section headings are used in the present document only for ease of understanding and do not limit scope of the embodiments to the section in which they are described.

Features of the technology disclosed in this patent document are described by example embodiments with reference to the accompanying drawings.

A high-capacitance anode for devices with electrodes (including, e.g., electrochemical devices such as a secondary battery) can be manufactured by applying a silicon-based active material having high discharge capacitance relative to a carbon-based active material as an anode active material. However, the silicon-based active material has a volume expansion rate higher than the carbon-based active material, and an electrode can become swollen or expanded during continuous charging/discharging of a lithium secondary battery including a silicon-based active material.

Figure 1:
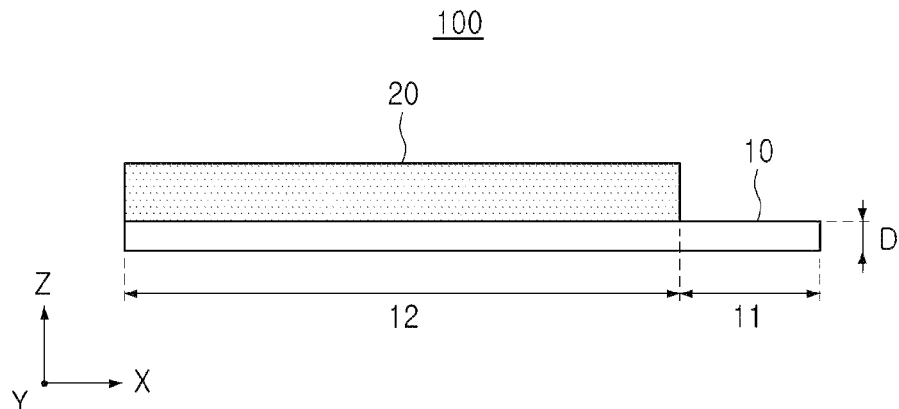
FIG. 1 is a cross-sectional view illustrating an example of an anode for devices with electrodes such as secondary batteries based on some embodiments of the disclosed technology.

FIG. 1 is a cross-sectional view illustrating an example of an anode for a device with an anode such as a secondary battery based on some embodiments of the disclosed technology. When the electrode is swollen or expanded, the electrode may be deformed in a surface direction (X-axis and Y-axis) of an anode mixture layer 20 on an anode current collector 10, as well as in a thickness direction (a Z-axis) in which anodes are stacked. In particular, in the case of an uncoated portion 11 (See FIGS. 1 and 2A-2D), which includes an anode tab 110 and a portion where the anode mixture layer 20 is not formed on a surface of the anode current collector 10, when the anode active material in the anode mixture layer 20 expands, strong stress may occur at an interface between the portion in which the anode mixture layer is formed and a portion in which the anode mixture layer is not formed, causing the anode current collector 10 to fracture.

In some implementations, such a fracture may be reduced or avoided by increasing the thickness of the anode current collector. However, in this case, a unit price may increase as the thickness of the anode current collector increases and there are practical difficulties in securing energy density of the anode due to an increase in weight and volume of a battery.

As described above, if the thickness of the anode current collector is increased to prevent fracture of the anode current collector in the anode including the silicon-based active material, it may be difficult to secure excellent energy density and economic feasibility of the anode. The disclosed technology can be implemented in some embodiments to provide an anode for secondary battery and a manufacturing method thereof that may substantially solve the above problems even without increasing the thickness of the anode current collector, as will be discussed below with reference to FIGS. 1 to 5.

FIGS. 2A to 2D are top views illustrating examples of an anode for secondary batteries based on some embodiments of the disclosed technology.

Figure 2A:
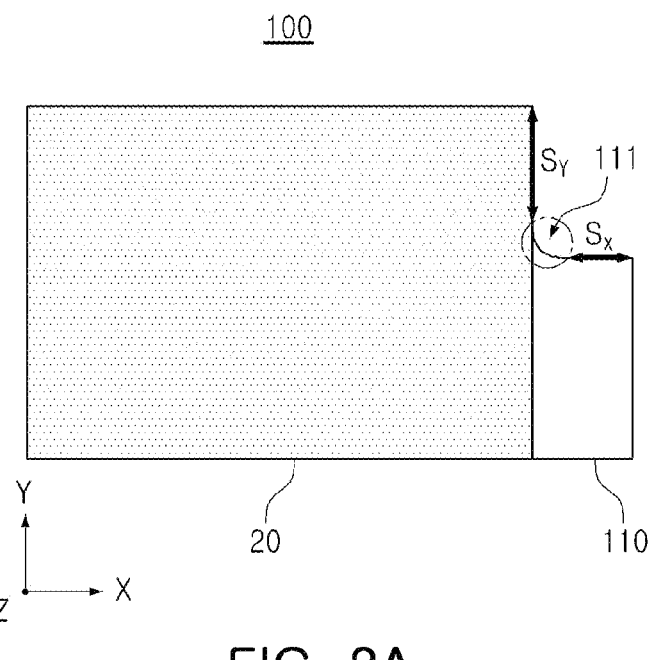
FIGS. 2A to 2D are top views illustrating examples of an anode for devices with electrodes such as secondary batteries based on some embodiments of the disclosed technology.
Figure 3:
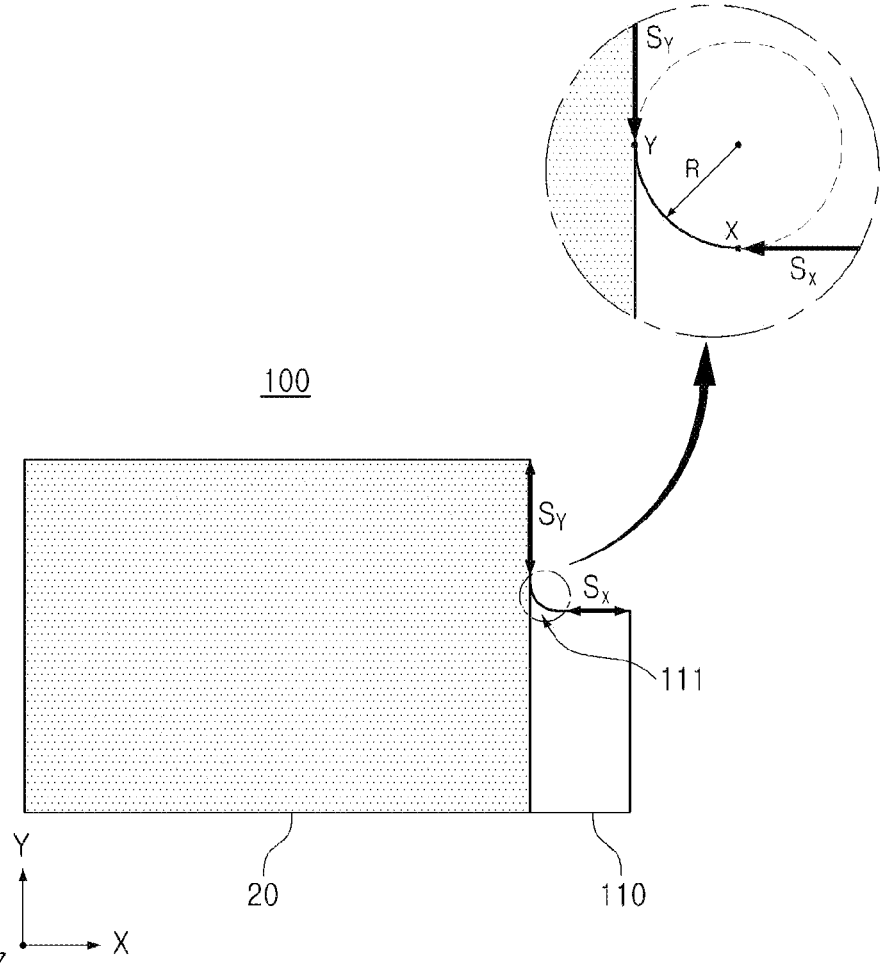
FIG. 3 is an enlarged view of a shape of a rounded portion in FIG. 2A.

FIG. 3 is an enlarged view of a shape of a rounded portion in FIG. 2A.

Figure 4:
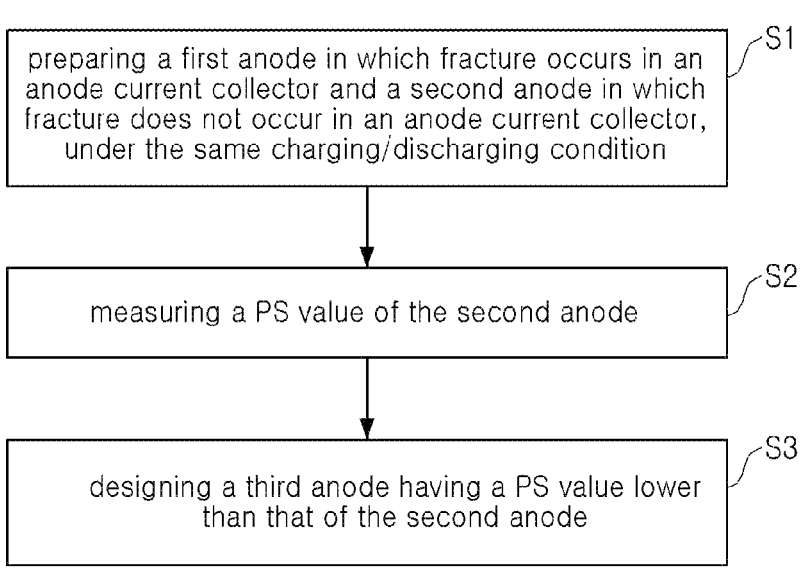
FIG. 4 is a flowchart showing a method of manufacturing an anode for devices with electrodes such as secondary batteries based on some embodiments of the disclosed technology.

FIG. 4 is a flowchart showing a method of manufacturing an anode for secondary battery based on some embodiments of the disclosed technology.

Figure 5:
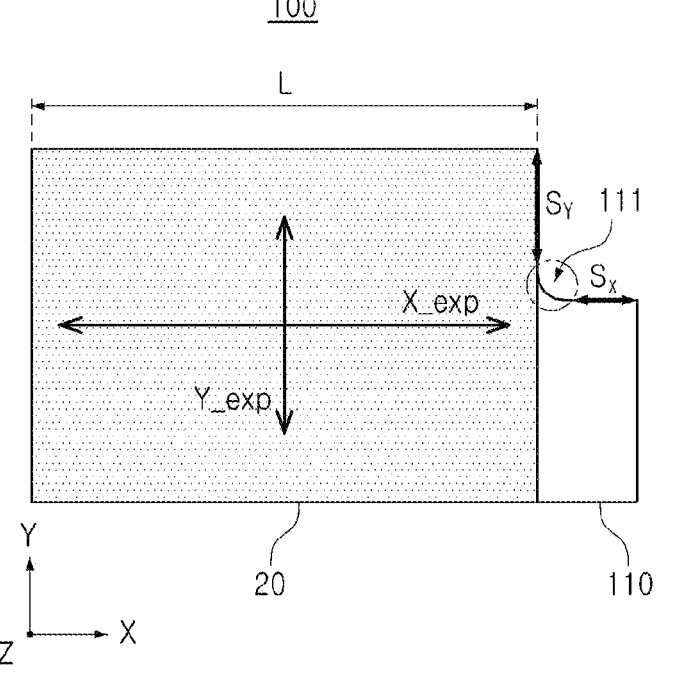
FIG. 5 is a top view illustrating an example of an anode for devices with electrodes such as secondary batteries based on some embodiments of the disclosed technology.

FIG. 5 is a top view illustrating an example of an anode for secondary batteries based on some embodiments of the disclosed technology.

Anode for Secondary Battery

FIG. 1 shows an example of an implementation of an anode 100 of the disclosed technology. This anode and other anodes disclosed in this patent document can be used as an anode in various devices including electrochemical devices such as batteries, an anode 100 for secondary battery includes: an anode current collector 10; and an anode mixture layer 20 disposed on at least one surface of the anode current collector, wherein the anode mixture layer 20 includes a silicon-based active material, wherein the anode current collector includes a tab connection portion $S_X$, a shoulder portion $S_Y$, and a rounded portion 111 located therebetween, wherein the rounded portion 111 has a radius of curvature satisfying value R according to Equation 1 below.

$$(p \times A + q) - r < R \le (p \times A + q) + r \qquad \text{[Equation 1]}$$

In Equation 1, all parameters p, A, q, r, and R are numerical values without units. The numerical value of R represents a value of the radius of curvature measured in millimeter (mm) of the rounded portion; the value of A corresponds to a weight ratio measured in weight percent (wt %) of the silicon-based active material to the anode mixture layer; p is a numerical value ranging from 0.05 to 0.2; q is a numerical value ranging from 0.1 to 1; and r is a numerical value ranging from 0.1 to 1.

The anode 100 for a secondary battery includes the anode current collector 10 and the anode mixture layer 20 disposed on at least one surface of the anode current collector. At this time, the anode current collector may include an uncoated portion 11 in which the anode mixture layer is not formed on a surface and a coated portion 12 in which the anode mixture layer is formed on at least one surface thereof.

As described above, in order to prevent fracture of the anode current collector 10 during continuous charging/discharging of the secondary battery, a thickness D of the anode current collector may be increased. However, it may be difficult for the anode including the relatively thick anode current collector to secure high energy density due to the volume and weight thereof, and it may also be difficult to secure economic feasibility considering the increase in unit price of the anode current collector.

In some implementations, in a lithium secondary battery according to an exemplary embodiment, an anode current collector includes the rounded portion 111 having an appropriate radius R of curvature, so that electrode deformation due to swelling and fracture of the anode current collector may be suppressed, even without increasing the thickness of the anode current collector. The radius R of curvature and the rounded portion 111 will be described in more detail below with reference to FIGS. 2A to 2D.

The anode current collector 10 includes a tab connection portion $S_X$, a shoulder portion $S_Y$, and the rounded portion 111 located therebetween, and the rounded portion 111 has a radius of curvature satisfying the value R according to Equation 1 above.

Figure 2B:
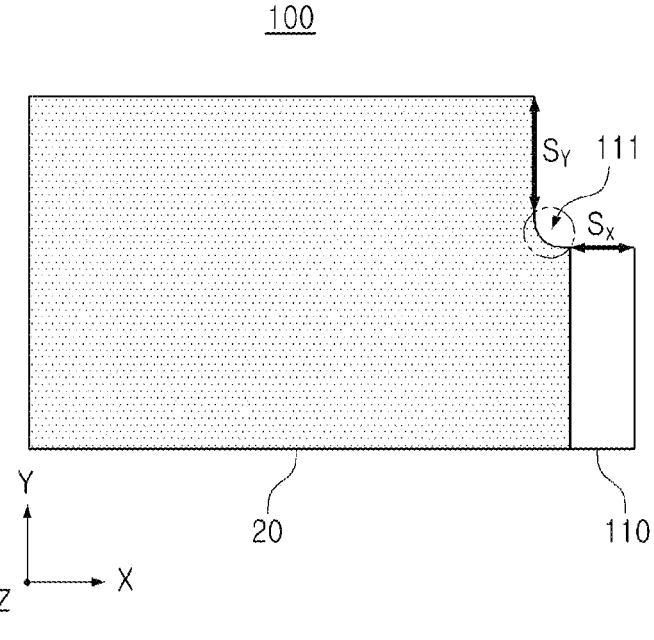
Figure 2C:
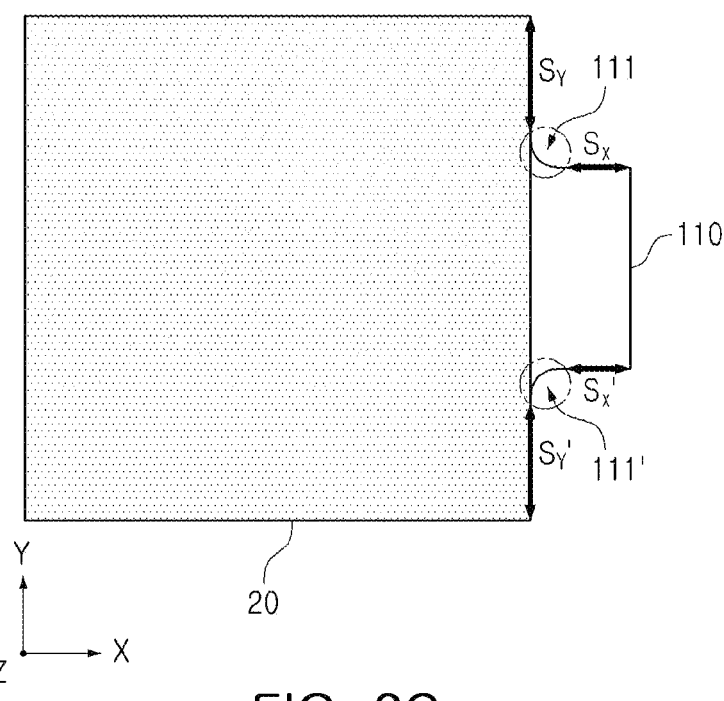
Figure 2D:
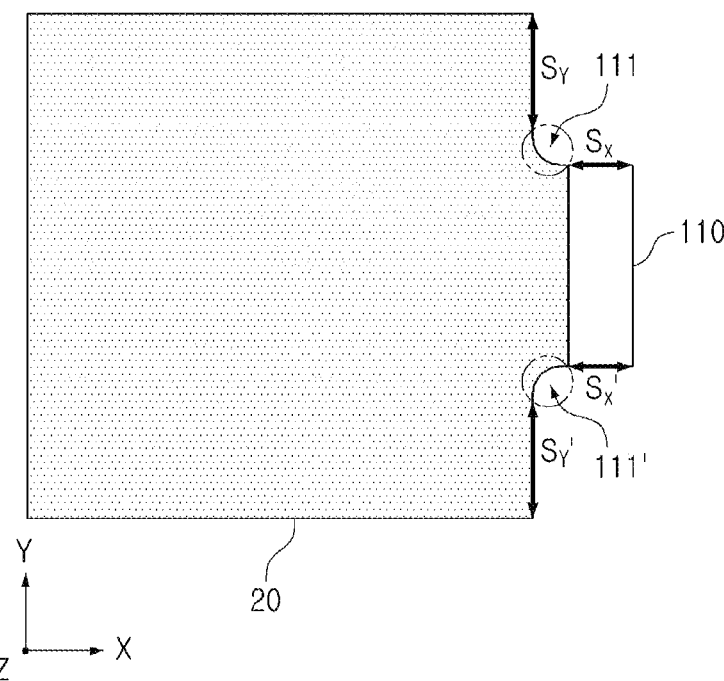

The anode 100 for a secondary battery may have a structure formed such that the anode mixture layer 20 is in contact with a boundary of the rounded portion 111 (refer to FIG. 2A), a structure in which the anode mixture layer 20 includes a portion of the rounded portion 111 (not shown), or a structure in which the anode mixture layer 20 includes the entire rounded portions 111 (refer to FIG. 2B).

A portion of the anode current collector 10 may be cut by using a method, such as laser notching, to form the anode tab 110 on the uncoated portion 11 of the anode current collector 10 in which the anode mixture layer 20 is not formed. At this time, the anode tab 110 may be formed to include a tab connection portion $S_X$, which is a portion connected to an electrode lead through welding or the like later; and a shoulder portion $S_Y$, which is an outer boundary portion with the anode mixture layer 20.

The tab connection portion $S_X$ may be a straight portion (refer to FIG. 2A) located on one side surface of the anode tab 110 based on a direction toward the anode tab 110 from the anode mixture layer 20 when the anode mixture layer 20 and the anode tab 110 are assumed to be lower and upper portions, respectively.

The shoulder portion $S_Y$ is located at the boundary between the anode mixture layer 20 and the outside based on a surface of the anode current collector 10 in which the anode tab 110 is located, and may be a straight line portion (See, for example, FIG. 2A) adjacent to the tab connection portion $S_X$.

The tab connection portion $S_X$ and the shoulder portion $S_Y$ may be connected by the rounded portion 111. Specifically, a first point X, which is a point that changes from a straight line to a curved shape, may exist between the tab connection portion $S_X$ and the rounded portion 111, and a second point Y, which is a point at which a straight line shape changes into a curved line shape may exist between the shoulder portion $S_Y$ and the rounded portion 111 (See FIG. 3).

The anode current collector 10 may include the rounded portions 111 on each of one surface and the other surface. That is, the anode for a secondary battery according to an exemplary embodiment may have a structure in which the anode current collector 10 includes a first tab connection portion $S_X$, the first shoulder portion $S_Y$, and the first rounded portion 111 located therebetween on one surface thereof, and includes a second tab connection portion $S_X'$, a second shoulder portion $S_Y'$, and a second rounded portion 111' located therebetween on the other surface thereof (refer to FIG. 2C, etc.).

In the process of forming the anode current collector 10 to include the rounded portion 111 as described above, a value of the radius R of curvature of the rounded portion may satisfy the condition of Equation 1 above. In this case, the value of the radius R of curvature of the rounded portion may be measured based on the rounded portion between the first point X and the second point Y. In addition, when the anode current collector 10 has a structure including the rounded portions 111 on one surface and the other surface (refer to FIG. 2C, etc.), the value of the radius R of curvature of the rounded portion may be measured based on any one of the first rounded portion 111 between the first point X and the second point Y and the second rounded portion 111' between the first' point X' and the second' point Y'.

When the value of the radius R of curvature of the rounded portion 111 satisfies the condition of Equation 1 above, even if a swelling phenomenon occurs in the anode due to expansion of the silicon-based active material included in the anode mixture layer 20, the stress applied to the anode current collector may be advantageously dispersed to prevent damage to the anode. If the value of the radius R of curvature of the rounded portion 111 is too low, it is substantially hard to disperse the stress applied to the anode current collector and to prevent a fracture thereof. On the other hand, if the value of the radius R of curvature of the rounded portion 111 is too high, it is relatively difficult to design and manufacture the shape of the uncoated portion with an excessively large curved portion.

Specifically, the condition of Equation 1 is set in consideration of a weight ratio A of the silicon-based active material to the anode mixture layer, and accordingly, when the value of the radius R of curvature of the rounded portion 111 is adjusted, a shape of the anode current collector 10 may be appropriately controlled according to a weight ratio of the silicon-based active material. Therefore, even if the anode mixture layer 20 contains a high content of silicon-based active material, damage to the anode may be prevented without substantially increasing a thickness of the anode current collector 10.

In Equation 1, p is a value ranging from 0.05 to 0.2 as a silicon-based active material content coefficient, q is a value ranging from 0.1 to 1 as a silicon-based active material content constant, and r is a value ranging from 0.1 to 1 as a correction value. Specifically, a value of p may include 0.1, a value of q may include 0.5, and a value of r may include 0.5. When the values of p, q, and r are adjusted within the ranges mentioned above, the value of the radius R of curvature of the rounded portion 111 may be appropriately controlled in consideration of a weight ratio of the silicon-based active material to the anode mixture layer 20. Accordingly, when designing an anode including a silicon-based active material, energy density, lifespan characteristics, and the like may all be secured at an excellent level.

As an example, when a weight ratio of the silicon-based active material to the anode mixture layer 20 is 10 wt % (In other words, A is 10), p is 0.1, q is 0.5, and r is 0.5, the value of the radius R of curvature of the rounded portion 111 may be greater than 1.0, may be equal to or greater than 1.5, and may be less than or equal to 2.0.

In the anode 100 for a secondary battery, the shape of the anode current collector 10 may be appropriately formed in consideration of a weight ratio of the silicon-based active material included to the anode mixture layer 20, so that stress applied to the anode current collector 10 may be dispersed due to expansion of the silicon-based active material during charging/discharging for the lithium secondary battery including the anode, and thus, the effect thereof may be minimized. Therefore, even if the secondary battery undergoes continuous charging/discharging processes, fracture may not substantially occur in the anode current collector, and lifespan characteristics of the battery may be improved to an excellent level.

The anode current collector 10 may have a thickness ranging from 1 μm to 10 μm. Specifically, the anode current collector 10 may have a thickness of 2 μm or more, 4 μm or more, 8 μm or less, or 6 μm or less. If the thickness of the anode current collector 10 is too thin, a problem, such as durability, may occur, and if the thickness is too thick, it may be difficult to secure an excellent level of energy density of the anode. Therefore, when the thickness of the anode current collector 10 is within the above range, both durability and energy density may be improved to an excellent level.

The anode current collector 10 may be at least one selected from the group consisting of copper foil, nickel foil, stainless steel foil, titanium foil, nickel foam, copper foam, a polymer substrate coated with a conductive metal, and combinations thereof. Specifically, the anode current collector 10 may be a copper foil.

A weight ratio of the silicon-based active material to the anode mixture layer 20 may range from 3 to 50 wt %. A weight ratio of the silicon-based active material may be a value calculated based on a solid content. Specifically, A weight ratio of the silicon-based active material to the anode mixture layer 20 may be 5 wt % or more, 10 wt % or more, 40 wt % or less, or 30 wt % or less. When the weight ratio of the silicon-based active material to the anode mixture layer 20 is within the above range, an excellent level of energy density may be secured, while minimizing the effect of expansion of the anode during charging/discharging.

The silicon-based active material may include at least one of Si, SiOx ($0<x<2$), Q-doped or Q-coated SiOx ($0<x<2$), Si-Q alloy, or Si—C composite, wherein Q includes at least one of alkali metals, alkaline earth metals, Group 13 elements, Group 14 elements, Group 15 elements, Group 16 elements, transition metals, rare earth elements, or a combination of one or more of alkali metals, alkaline earth metals, Group 13 elements, Group 14 elements, Group 15 elements, Group 16 elements, transition metals, and rare earth elements, without Si.

The anode mixture layer 20 may further include a carbon-based active material. As an example, the carbon-based active material may be at least one selected from artificial graphite, natural graphite, hard carbon, soft carbon, carbon black, acetylene black, Ketjen black, super P, graphene, and fibrous carbon, but is not limited thereto. When the anode mixture layer 20 further includes a carbon-based active material, a weight ratio of the carbon-based active material may be 50 to 97 wt %. The weight ratio of the carbon-based active material may be a value calculated based on a solid content.

The anode mixture layer 20 may further include a conductive material. The conductive material is used to impart conductivity to the electrode and to maintain the structure of the electrode, and a conductive material having conductivity without causing side reactions with other elements of the secondary battery may be used. As an example, the conductive material may include one or more selected from graphite, such as natural graphite or artificial graphite; carbon-based materials, such as carbon black, acetylene black, Ketjen black, channel black, furnace black, lamp black, summer black, and carbon fiber; metal powder particles or metal fibers, such as copper, nickel, aluminum, and silver; conductive whiskers, such as zinc oxide and potassium titanate; conductive metal oxides, such as titanium oxide; and conductive polymers, such as polyphenylene derivatives, but is not limited thereto. When the anode mixture layer 20 further includes a conductive material, a weight ratio of the conductive material may be 0.1 to 10 wt %. The weight ratio of the conductive material may be a value calculated based on a solid content.

The anode mixture layer 20 may further include a binder. The binder is not particularly limited as long as it is a compound that serves to properly attach components in the anode mixture layer to each other and properly attach the anode mixture layer to a current collector. As an example, the binder may be at least one rubber-based binder selected from the group consisting of styrene-butadiene rubber (SBR), fluorine-based rubber, ethylene propylene rubber, butyl acrylate rubber, butadiene rubber, isoprene rubber, acrylonitrile rubber, acrylic rubber and silane-based rubber; a cellulosic binder, such as carboxymethylcellulose (CMC), hydroxypropylmethylcellulose, methylcellulose, or alkali metal salt thereof; a water-soluble polymer-based binder, such as a polyacrylic acid (PAA)-based binder, a polyvinyl alcohol (PVA)-based binder, and a polyvinyl alcohol-polyacrylic acid (PVA-PAA) copolymer-based binder; and combinations thereof. When the anode mixture layer 20 further includes a binder, a weight ratio of the binder may be 0.1 to 10 wt %. The weight ratio of the binder may be a value calculated based on a solids content.

Method of Manufacturing Anode for Secondary Battery

A method of manufacturing an anode 100 for secondary battery according to an exemplary embodiment includes: preparing a first anode including a first anode current collector with a fracture and a second anode including a second anode current collector without a fracture under a same charging and discharging condition; and constructing a third anode including a third anode current collector and having a PS value lower than a plastic strain (PS) value of the second anode. In some implementations, the PS value may indicate the maximum plastic strain value of a round part, which is a parameter for predicting and preventing the occurrence of fracture of the current collector by measuring the degree of deformation received by the current collector when the volume of the negative electrode mixture layer expands. Accordingly, when the PS value is large, the impact on the current collector is large, and thus the probability of fracture is high, and when the PS value is small, the probability of fracture is low. It is desirable to reduce the PS value.

Each of the first anode, the second anode, and the third anode includes an anode mixture layer 20 disposed on at least one surface of the first anode current collector, the second anode current collector, and the third anode current collector, respectively, wherein the anode mixture layer 20 includes a silicon-based active material, wherein each of the first anode current collector, the second anode current collector, and the third anode current collector includes a tab connection portion $S_X$, a shoulder portion $S_Y$, and a rounded portion 111 located therebetween, and wherein the plastic strain (PS) value for each of the second and third anode is a maximum plastic strain value of the rounded portion 111 where a plastic strain value differs depending on the position thereof. It is possible to measure the degree of deformation of the anode current collector 10 when the anode mixture layer 20 expands, and to predict and prevent fracture of the anode current collector 10 by comparing and analyzing the PS value for each anode.

A detailed description of the anode current collector, anode mixture layer, silicon-based active material, etc. of the first anode, the second anode, and the third anode is the same as the description of the anode current collector 10, the anode mixture layer 20, and the silicon-based active material, etc. of the anode 100 for a secondary battery described above and is thus omitted.

According to an exemplary embodiment, a method of manufacturing an anode for secondary battery having excellent energy density and lifespan characteristics may be provided when an anode (the third anode) is designed in consideration of the characteristics of an anode (the first anode) in which the anode current collector is actually broken and an anode (the second anode) in which fracture does not occur in the anode current collector under the same charging/discharging condition.

Specifically, the method of manufacturing an anode for a secondary battery may include operation S1 of preparing a first anode including a first anode current collector with a fracture and a second anode including a second anode current collector without a fracture under a charging and discharging condition. As an example, the charging and discharging condition may be a condition in which a cycle of charging a lithium secondary battery including the anode 100 for secondary battery to ⅓ C and discharging to ⅓ C within a range of 100% in SoC 0 at 25° C. is repeated one or more times. Whether fracture occurs in the anode current collector 10 may be evaluated by visually observing whether fracture occurs at an edge portion (a grid region) of a tab welding portion of the anode current collector.

The method of manufacturing an anode for a secondary battery may include operation S2 of measuring a PS value of the second anode after the operation S1. Specifically, operation S2 is an operation of measuring the maximum plastic strain (PS) value of the rounded portion included in the anode current collector in the second anode in which fracture does not occur in the anode current collector during charging/discharging, and the plastic strain is a numerical value representing the degree of deformation of a material in percentage (%) when plastic deformation occurs in which permanent deformation occurs without returning to the original shape even if external force is removed from the material to which the external force is applied. The plastic strain value of the rounded portion may be measured and calculated by pulling the uncoated portion 11 by a tensile strength measurement device after the anode is fixed, regarding the curved portion between the first point X, which is a point present between the tab connection portion $S_X$ and the rounded portion 111 and changing from a straight line shape to a curved line shape, and the second point Y, which is a point present between the shoulder portion $S_Y$ and the rounded portion 111 and changing from the straight line shape to a curved line shape.

The degree of stress received by the rounded portion when the anode expands at a constant expansion rate by the silicon-based active material in the anode mixture layer may be quantified and evaluated through the maximum PS value of the rounded portion. At this time, as the maximum plastic strain value of the rounded portion is higher, the stress applied to the rounded portion may increase, and a possibility of fracture of the anode current collector during charging/discharging with respect to the actually manufactured anode for a secondary battery may also be high. Therefore, when the anode is designed to have a PS value lower than the maximum plastic strain value of the rounded portion in the anode in which fracture actually occurs in the anode current collector during charging/discharging, it is practically possible to prevent fracture in the anode current collector under the same charging/discharging condition.

In this regard, the method of manufacturing an anode for a secondary battery may include operation S3 of constructing a third anode including a third anode current collector and having a plastic strain (PS) value lower than a plastic strain (PS) value of the second anode. Specifically, operation S3 is an operation of constructing the third anode in which a maximum plastic strain (PS) value of the rounded portion included in the anode current collector is relatively low, compared to the second anode in which fracture does not occur during charging and discharging, and an anode manufactured according to the method for manufacturing an anode for secondary battery according to an exemplary embodiment may be the third anode.

The preparing of the third anode may be performed under a condition that a surface direction expansion rate value of the third anode may be equal to or greater than the surface direction expansion rate value of the second anode. At this time, the surface direction expansion rate value may be calculated based on the major axis (the X axis) and minor axis (the Y axis) of the surface direction according to Equation 2 below.

$$\text{Expansion rate } (\%) = (T_2 - T_1)/T_1 \times 100 \qquad \text{[Equation 2]}$$

In Equation 2, $T_1$ is a thickness in a direction of the electrode surface in a discharged state (SOC 0%) before charging, and $T_2$ is a thickness in the direction of the electrode surface in a charged state (SOC 100%).

The PS value ratio of the third anode to the second anode may be equal to or larger than 0.1 and less than 1, or 0.3 to 0.8. Specifically, when the anode mixture layer expands by 1% in horizontal and vertical directions (an X-axis and a Y-axis), the PS value ratio of the third anode to the second anode may be 0.1 or more to less than 1, and 0.5 to 0.8, and the PS value ratio of the third anode to the second anode when the anode mixture layer expands by 1.5% in the horizontal and vertical directions (the X-axis and the Y-axis) may be 0.1 or more to less than 1, and 0.4 to 0.6.

The PS value of the third anode may range from 0.1 to 20%. Specifically, the third anode may have a PS value of 10% or less, 6% or less, or 1% or more when the anode mixture layer expands by 1% in the horizontal and vertical directions (the X-axis and the Y-axis). In addition, the third anode may have a PS value of 20% or less, 10% or less, or 1% or more when the anode mixture layer expands by 1.5% in the horizontal and vertical directions (the X-axis and the Y-axis).

The method of designing the PS value of the third anode to be lower than that of the second anode in the operation S3 is not particularly limited, but a method of appropriately adjusting the value of the radius R of curvature of the rounded portion 111 in the process of forming the anode tab 110 by cutting a partial region of the uncoated portion 111 of the anode current collector 10 may be applied. A detailed description of the rounded portion 111 and the like will be described below.

In some implementations, a thickness of the anode current collector of the first anode may be less than a thickness of the anode current collector of the second anode. As described above, as the anode current collector becomes thicker, fracture due to stress according to expansion of the silicon-based active material may be suppressed. Accordingly, the thickness of the anode current collector of the first anode in which fracture occurs in the anode current collector may be less than the thickness of the anode current collector of the second anode in which fracture does not occur the anode current collector, under the same charging/discharging condition. However, since there is a limitation in improving energy density of the anode 100 as the thickness of the anode current collector 10 increases, in the case of the second anode including a relatively thick anode current collector, the energy density is relatively inferior and economic feasibility may also be inferior due to problems, such as unit price.

In this regard, a thickness of the anode current collector of the third anode may be less than the thickness of the anode current collector of the second anode. Specifically, although the third anode has a PS value lower than that of the second anode in which fracture does not occur in the anode current collector having a thickness greater than that of the first anode, the thickness of the anode current collector of the third anode may be less than the thickness of the anode current collector of the second anode. This is because, when the third anode is designed by a method of appropriately forming the value of the radius R of curvature of the rounded portion included in the anode current collector, the PS value of the third anode may be lowered although the thickness of the anode current collector is not increased. Accordingly, when the thickness of the anode current collector of the third anode is less than the thickness of the anode current collector of the second anode, the anode manufactured according to this method may have excellent energy density and economic feasibility as well as excellent durability and lifespan characteristics.

The third anode may include a rounded portion that has a radius of curvature satisfying value R measured in millimeter (mm) in a range according to Equation 1 below.

$$(p \times A + q) - r < R \leq (p \times A + q) + r \qquad \text{[Equation 1]}$$

In Equation 1, all parameters p, A, q, r, and R are numerical values without units. The numerical value of R represents a value of the radius of curvature measured in millimeter (mm) of the rounded portion; the value of A corresponds to a weight ratio measured in weight percent (wt %) of the silicon-based active material to the anode mixture layer; p is a numerical value ranging from 0.05 to 0.2; q is a numerical value ranging from 0.1 to 1; and r is a numerical value ranging from 0.1 to 1.

The third anode may have a relatively low PS value by appropriately forming the rounded portion included in the anode current collector, and the rounded portion of the third anode may have the value of the radius R of curvature value satisfying the condition of Equation 1 above. That is, the anode 100 for a secondary battery described above may be manufactured by the method of manufacturing an anode for a secondary battery. A detailed description of the radius R of curvature, Equation 1, etc. is the same as the description above, and thus, is omitted.

The method of manufacturing the anode 100 for a secondary battery may further include operation S4 of manufacturing the third anode according to the design described above, and the manufacturing method is not particularly limited as long as the third anode is manufactured according to the design described above. As an example, the third anode may be manufactured by forming an anode mixture layer by applying a first anode slurry including a first solvent, a first carbon-based active material, a first silicon-based active material, a first binder, and a first conductive material on an anode current collector, such as copper foil (Cu-foil), by a method, such as bar coating, casting, or spraying, and drying at 70 to 100° C. At this time, the anode mixture layer may be formed to have a multilayer structure according to an additional design, etc. and in this case, the third anode may be manufactured by forming a second anode mixture layer by applying a second anode slurry including a second solvent, a second carbon-based active material, a second silicon-based active material, a second binder, and a second conductive material on the anode mixture layer by a method, such as bar coating, casting, or spraying, and drying at 70 to 100° C.

The solvent may be, for example, dimethyl sulfoxide (DMSO), isopropyl alcohol, N-methylpyrrolidone (NMP), acetone, or water, and the solvent may be used by an amount for dissolving or dispersing the active material, the conductive material, and the binder in consideration of an application thickness and manufacturing yield of a composition for forming the anode mixture layer and to have a viscosity capable of exhibiting excellent thickness uniformity during application for forming the anode mixture layer.

In some implementations, the third anode on which the anode mixture layer 20 is formed on the anode current collector 10 by the method described above may include the uncoated portion 11 having a surface on which the anode mixture layer is not formed, and the rounded portion 111 may be appropriately formed in the process of notching a partial region of the uncoated portion to form the anode tab 110. At this time, the rounded portion 111 may be formed to have the value of the radius R of curvature satisfying the condition of Equation 1 above.

Lithium Secondary Battery

A lithium secondary battery according to an exemplary embodiment includes the anode 100 for a secondary battery described above. Specifically, the lithium secondary battery may include the anode for a secondary battery described above, a cathode, and a separator interposed between the cathode and the anode.

The active material of the cathode is not particularly limited, but may include at least one selected from lithium-transition metal oxides, such as lithium cobalt oxide (LiCoO$_2$), lithium manganese oxide (LiMn$_2$O$_4$), and lithium nickel oxide (LiNiO$_2$); lithium-transition metal composite oxides in which a portion of these transition metals are substituted with other transition metals; and combinations thereof. Specifically, the cathode may include at least any one selected from lithium-nickel-manganese oxides (LNMO) that does not include cobalt (Co) as an active material and is represented by a chemical formula, such as LiNi$_x$Mn$_{2-x}$O$_4$ (0<x<1): lithium-permanganese oxide (LMR) that does not include nickel (Ni) and is represented by a chemical formula, such as Li$_{1+x}$Mn$_{2-x}$O$_4$ (0<x<0.1); nickel-chromium-manganese oxides (NCM) represented by a chemical formula, such as Li$_x$Ni$_a$Co$_b$Mn$_c$O$_y$, (0<x≤1.1, 2≤y≤2.02, 0<a<1, 0<b<1, 0<c<1, 0<a+b+c≤1), and lithium-phosphate-iron oxide (LFP) represented by a chemical formula, such as LiFePO$_4$.

The separator can be implemented in various ways suitable for a lithium secondary battery. As an example, the separator may include a porous substrate, and the porous substrate may be a polyolefin-based porous substrate. The polyolefin-based porous substrate may be a substrate having a plurality of pores and commonly used in electrochemical devices. The polyolefin-based porous substrate may be selected from the group consisting of a polyethylene single film, a polypropylene single film, a polyethylene/polypropylene double film, a polypropylene/polyethylene/polypropylene triple film, and a polyethylene/polypropylene/polyethylene triple film, but is not limited thereto.

When the lithium secondary battery includes the anode 100 for a secondary battery described above, it may include an anode in which the shape of the uncoated portion is appropriately adjusted according to a weight ratio of the silicon-based active material to the electrode to provide a lithium secondary battery having excellent energy density, capacitance characteristics, lifespan characteristics, etc.

EXAMPLE

1. Design of Anode for Secondary Battery (1) Comparative Example and Reference Example An anode (a first anode) of Comparative Example including an anode current collector (Cu-foil) including a coated portion in which an anode mixture layer including 10 wt % of silicon-based active material (SiOx; 0<x<2) based on a solid content is formed on one surface; and an uncoated portion excluding the coated portion was modeled (refer to FIG. 5). At this time, a thickness D of the anode current collector of Comparative Example was 6 μm, the anode current collector included a rounded portion having a value of radius R of curvature of 1.0 mm, and the coated portion was modeled such that only 95 mm, which is a portion of the total length of 262 mm, was a length L of the coated portion. In addition, an anode (a second anode) of Reference Example was modeled by designing the same as that of the anode of Comparative Example, but the thickness D of the anode current collector was set to 8 μm.

(2) Examples 1 and 2

Anodes (third anode) of Examples 1 and 2 were modeled by designing the same as that of the anode of Comparative Example, but setting the values of the radius R of curvature of the rounded portion to 1.5 mm and 2.0 mm, respectively.

(3) Whether Equation 1 is Satisfied

In the designed anodes, whether the value of the radius of curvature of the rounded portion satisfies the condition according to Equation 1 below was evaluated. At this time, in Equation 1, p was set to 0.1, q was set to 0.5, and r was set to 0.5, respectively, and a (p×A+q)±r value was calculated according to the condition of Equation 1 and shown in Table 1 below. A case in which the condition of Equation 1 was satisfied was marked as ◯, and a case in which the condition of Equation 1 was not satisfied was marked as X, and the results are shown in Table 1 below.

$$(p \times A + q) - r < R \leq (p \times A + q) + r \qquad \text{[Equation 1]}$$

In Equation 1, all parameters p, A, q, r, and R are numerical values without units. The numerical value of R represents a value of the radius of curvature measured in millimeter (mm) of the rounded portion; the value of A corresponds to a weight ratio measured in weight percent (wt %) of the silicon-based active material to the anode mixture layer; p is a numerical value ranging from 0.05 to 0.2; q is a numerical value ranging from 0.1 to 1; and r is a numerical value ranging from 0.1 to 1.

(4) Symmetry Condition for Each Direction and PS Value for Each Expansion Rate

Each of the modeled anodes was set to have a symmetry condition in the horizontal and vertical directions (the X-axis and the Y-axis) (refer to FIG. 5). At this time, considering that each anode is stacked in an actual secondary battery, a thickness direction (a Z axis) is also set to have a symmetry condition.

In addition, considering the expansion of the anode mixture layer including the silicon-based active material during the battery charging/discharging process, the expansion rate value was input so that the anode mixture layer in each modeled anode expands by 1% in the horizontal and vertical directions (the X-axis and the Y-axis), respectively, and the expansion rate value was input so that the anode mixture layer in each modeled anode expands by 1.5% in the horizontal and vertical directions (the X-axis and the Y-axis) under the same condition, respectively, and PS values according to each expansion rate are shown in Table 1 below. At this time, in the case of Example 1, the PS value when the expansion rate value was input so that the anode mixture layer expands by 1.3% in the horizontal and vertical directions (the X-axis and the Y-axis), respectively, under the same condition is also shown in Table 1 below.

2. Evaluation of Anode for Secondary Battery (1) Manufacturing of Anode

Designed anodes of Comparative Example and Reference Example were actually manufactured to evaluate whether fracture actually occurs in the anode current collector and the expansion rate during the charging/discharging process. At this time, in each of the manufactured anodes, a weight ratio of carbon-based active material (artificial graphite) to the anode mixture layer was 87 wt % based on a solid content, a weight ratio of silicon-based active material was 10 wt %, and a weight ratio of binders (SBR and CMC) was 1.5 wt %, and a weight ratio of the conductive material (CNT) was 1.5 wt %.

Thereafter, the secondary battery cell prepared by interposing a polyolefin separator between a cathode in which a cathode mixture layer including the NCM-based cathode active material was formed on a cathode current collector (Al-foil) and the anode prepared above was placed in a secondary battery pouch, and thereafter, an electrolyte solution in which 1M LiPF6 was dissolved in a mixed solvent of ethylene carbonate (EC) and diethyl carbonate (DEC) was injected into the secondary battery pouch, and then sealed to manufacture a pouch-type lithium secondary battery.

(2) Fracture Occurrence and Expansion Rate

After repeating the cycle of charging at ⅓ C and discharging at ⅓ C at 25° C. in the range of 0 to 100% of SOC with respect to the manufactured secondary battery one or more times, whether fracture occurs in an edge portion (a grid portion) of the anode current collector was visually evaluated. A case in which fracture occurred was marked as ○ and a case in which fracture did not occur was marked as X and results thereof are shown in Table 1 below.

In addition, after repeating the cycle of charging at ⅓ C and discharging at ⅓ C at 25° C. in the range of 0 to 100% of SOC with respect to the manufactured secondary battery one or more times, according to a measurement of an expansion rate in the direction of the anode surface according to Equation 2 below, the expansion rates of the major axis (the X axis) and minor axis (the Y axis) in the surface direction were 1%, respectively.

$$\text{Expansion rate }(\%)=(T_2-T_1)/T_1\times100 \qquad \text{[Equation 2]}$$

In Equation 2, $T_1$ is a thickness of the electrode in the surface direction in a discharged state (SOC 0%) before charging, and $T_2$ is a thickness of the electrode in the surface direction in a charged state (SOC 100%).

In some implementations, a plastic strain value of the rounded portion and a PS value corresponding thereto may be measured and calculated by pulling the uncoated portion 11 by a tensile strength measurement device after the anode is fixed, regarding the curved portion between the first point X, which is a point present between the tab connection portion $S_X$ and the rounded portion 111 and changing from a straight line shape to a curved line shape, and the second point Y, which is a point present between the shoulder portion $S_Y$ and the rounded portion 111 and changing from the straight line shape to a curved line shape in the anode manufactured as described above.

TABLE 1

|  | Comparative Example | Reference Example | Example 1 | Example 2 |
|---|---|---|---|---|
| Radius of curvature | 1.0 mm | 1.0 mm | 1.5 mm | 2.0 mm |
| Thickness of anode current collector (D) | 6 μm | 8 μm | 6 μm | 6 μm |
| Length of coated portion (L) | 95 mm | 95 mm | 95 mm | 95 mm |
| Weight ratio of SiOx | 10 wt % | 10 wt % | 10 wt % | 10 wt % |
| (p × A + q) ± r | 1.5 ± 0.5 | 1.5 ± 0.5 | 1.5 ± 0.5 | 1.5 ± 0.5 |
| Whether Equation 1 is satisfied | X | X | ○ | ○ |
| PS value (when expended by 1%) | 12.87% | 12.35% | 8.86% | 5.44% |
| PS value (when expanded by 1.3%) | — | — | 12.44% | — |
| PS value (when expanded by 1.5%) | 28.35% | 26.41% | 15.73% | 9.39% |
| Occurrence of fracture | ○ | X | — | — |
| Actual expansion rate | 1% | 1% | — | — |

Referring to Table 1, it can be seen that, in the case of the anode of Reference Example in which the thickness D of the anode current collector was designed to be relatively large compared to Comparative Example, the maximum plastic strain value of the rounded portion was relatively low even if the same expansion rate was input. In addition, the anodes of Comparative Example and Reference Example were actually manufactured and whether fracture occurred during the charging/discharging process under the same condition was evaluated and results thereof show that fracture did not occur in the anode of Reference Example, unlike the anode of Comparative Example in which fracture occurred although the actual expansion rate was the same. Considering this, if the thickness of the anode current collector is designed to be relatively large when the value of the radius of curvature of the rounded portion is the same, it is determined that the plastic strain of the rounded portion may be reduced during charging/discharging to suppress fracture of the anode current collector.

In some implementations, in the case of Examples 1 and 2 in which the maximum plastic strain value of the rounded portion was controlled to be lower than that of Comparative Example and Reference Example at the same expansion rate, it was confirmed that the value of the radius of curvature of the rounded portion satisfies the condition of Equation 1, unlike Comparative Example and Reference Example. Considering this, even if the thickness of the anode current collector is not designed to be relatively large as in Reference Example, when the value of the radius R of curvature is properly designed in consideration of the maximum plastic strain value of the rounded portion, the stress due to the expansion of the anode may be distributed to minimize the effect and effectively suppress the occurrence of fracture in the anode current collector.

In this regard, considering the experimental results related to the occurrence of fracture of the anodes actually manufactured according to the design of Comparative Example and Reference Example, the anodes of Examples 1 and 2 had maximum plastic strain values lower than that of Reference Example at the same expansion rate (1%). In addition, in the case of Example 1, even if the expansion rate of 1.3% was input, the maximum plastic strain value was relatively low compared to Comparative Example to which the expansion rate of 1% was applied, and in the case of Example 2, even if the expansion rate of 1.5% was input, the maximum plastic strain value was relatively low compared to Comparative Example and Reference Example to which the expansion rate of 1% was applied. Considering this, even if an expansion rate equal to or higher than the expansion rate in the surface direction of the existing anode is applied during charging/discharging of the anode manufactured according to the design of Examples 1 and 2, it is determined that the occurrence of fracture of the anode current collector is effectively suppressed.

Therefore, in the case of the anode in which the anode current collector is designed to include the rounded portion having the value of the radius R of curvature satisfying the condition of Equation 1, as in Examples 1 and 2, the occurrence of fracture in the anode current collector during the charging/discharging process may be substantially alleviated, while maintaining a thin thickness of the anode current collector, it may be determined that energy density, economic feasibility, lifespan characteristics, etc. are all excellent.

In some embodiments of the disclosed technology, through designing of the shape of the anode current collector in consideration of the content of the silicon-based active material, etc., even if the content of the silicon-based active material of the anode increases, problems such as fracture of the current collector during battery charging/discharging, do not substantially arise, and thus, the anode for a secondary battery having excellent capacitance characteristics, durability, lifespan characteristics, and the like may be provided.

In some embodiments of the disclosed technology, it is possible to provide a method of manufacturing an anode for secondary battery having excellent energy density and securing economic feasibility by maintaining a thin current collector of an anode including a silicon-based active material.

The disclosed technology can be implemented in the field of secondary batteries or rechargeable batteries that widely used in electric vehicles, uninterruptible power supplies, battery storage power stations, and others including battery power storage for solar panels, wind power generators and other green tech power generators. Specifically, the disclosed technology can be implemented in some applications to provide an enhanced anode with reduced likelihood of anode fracture for an electrochemical device such as a battery to improve the battery reliability and performance and, accordingly, to mitigate climate change. Lithium secondary batteries based on the disclosed technology can be used to address various adverse effects such as air pollution and greenhouse emissions by powering electric vehicles (EVs) as alternatives to vehicles using fossil fuel based engines and by providing battery based energy storage systems (ESS) to store renewable energy such as solar power and wind power.

Only specific examples of implementations of certain embodiments are described. Variations, improvements and enhancements of the disclosed embodiments and other embodiments may be made based on the disclosure of this patent document.

What is claimed is:

1. An anode, comprising:
an anode current collector; and
an anode mixture layer disposed on at least one surface of the anode current collector,
wherein the anode mixture layer includes a silicon-based active material,
wherein the anode current collector includes a tab connection portion, a shoulder portion, and a rounded portion located therebetween, and
wherein the rounded portion has a radius of curvature satisfying a value R measured in millimeter (mm) in a range according to Equation expressed as:

$$(p \times A+q)-r<R \leq(p \times A+q)+r,$$

wherein A is a value corresponding to a weight ratio measured in weight percent (wt %) of the silicon-based active material to the anode mixture layer disposed on the at least one surface of the anode current collector, p is a value ranging from 0.05 to 0.2, q is a value ranging from 0.1 to 1, and r is a value ranging from 0.1 to 1,
wherein the silicon-based active material includes at least one of SiOx (0<x<2), Q-doped or Q-coated SiOx (0<x<2), Si-Q alloy, or Si-C composite,
wherein Q includes at least one of alkali metals, alkaline earth metals, Group 13 elements, Group 14 elements, Group 15 elements, Group 16 elements, transition metals, rare earth elements, or combinations of one or more of alkali metals, alkaline earth metals, Group 13 elements, Group 14 elements, Group 15 elements, Group 16 elements, transition metals, and rare earth elements, without Si, wherein the anode current collector has a thickness ranging from 1 μm to 6 μm,
wherein a ratio of the radius of curvature to the thickness of the anode current collector is in a range of 250 to 333.3.

2. The anode of claim 1, wherein a value of p includes 0.1, a value of q includes 0.5, and a value of r includes 0.5.

3. The anode of claim 1, wherein a weight ratio of the silicon-based active material to the anode mixture layer ranges from 3 to 50 wt %.

4. The anode of claim 1, wherein the anode mixture layer further includes a conductive material, and
wherein a weight ratio of the conductive material to the anode mixture layer ranges from 0.1 to 10 wt %.

5. The anode of claim 1, wherein the anode mixture layer further includes a binder, and
wherein a weight ratio of the binder to the anode mixture layer ranges from 0.1 to 10 wt %.

6. A secondary battery comprising an anode, wherein the anode comprises:
an anode current collector; and
an anode mixture layer disposed on at least one surface of the anode current collector,
wherein the anode mixture layer includes a silicon-based active material,
wherein the anode current collector includes a tab connection portion, a shoulder portion, and a rounded portion located therebetween, and
wherein the rounded portion has a radius of curvature satisfying a value R measured in millimeter (mm) in a range according to Equation expressed as:

$$(p \times A+q)-r<R \leq(p \times A+q)+r,$$

wherein A is a value corresponding to a weight ratio measured in weight percent (wt %) of the silicon-based active material to the anode mixture layer disposed on the at least one surface of the anode current collector, p is a value ranging from 0.05 to 0.2, q is a value ranging from 0.1 to 1, and r is a value ranging from 0.1 to 1,
wherein the silicon-based active material includes at least one of SiOx (0<x<2), Q-doped or Q-coated SiOx (0<x<2), Si-Q alloy, or Si-C composite,
wherein Q includes at least one of alkali metals, alkaline earth metals, Group 13 elements, Group 14 elements, Group 15 elements, Group 16 elements, transition metals, rare earth elements, or combinations of one or more of alkali metals, alkaline earth metals, Group 13 elements, Group 14 elements, Group 15 elements, Group 16 elements, transition metals, and rare earth elements, without Si,
wherein the anode current collector has a thickness ranging from 1 μm to 6 μm,
wherein a ratio of the radius of curvature to the thickness of the anode current collector is in a range of 250 to 333.3.

7. The secondary battery of claim 6, wherein a weight ratio of the silicon-based active material to the anode mixture layer ranges from 3 to 50 weight percent (wt %).

8. The secondary battery of claim 6, wherein the anode mixture layer further includes a conductive material, and
wherein a weight ratio of the conductive material to the anode mixture layer ranges from 0.1 to 10 wt %.

9. The secondary battery of claim 6, wherein the anode mixture layer further includes a binder, and wherein a weight ratio of binder to the anode mixture layer ranges from 0.1 to 10 wt %.

\* \* \* \* \*